United States Patent [19]

Iwao et al.

[11] 4,244,251

[45] Jan. 13, 1981

[54] FULL ROTATION-TYPE PAPER WEB CUTTING DEVICE

[75] Inventors: Souichi Iwao; Norihiko Suzuki; Yasuhiko Doi; Shigemitsu Shimizu; Takeshi Morikawa, all of Toyokawa, Japan

[73] Assignee: Minolta Camera Kabushiki Kaisha, Osaka, Japan

[21] Appl. No.: 33,019

[22] Filed: Apr. 24, 1979

[30] Foreign Application Priority Data

Apr. 28, 1978 [JP] Japan ............................ 53-54930[U]

[51] Int. Cl.$^3$ ............................................. B23D 25/02

[52] U.S. Cl. ........................................ 83/349; 83/583

[58] Field of Search ................. 83/348, 349, 583, 582, 83/355, 356.3

[56] References Cited

U.S. PATENT DOCUMENTS

| | | | |
|---|---|---|---|
| 1,005,879 | 10/1911 | Ries | 83/583 X |
| 1,302,398 | 4/1919 | Mangini | 83/583 X |
| 2,130,473 | 9/1938 | Ruau | 83/583 |
| 3,812,753 | 5/1974 | Kiejzik | 83/583 X |
| 3,960,080 | 1/1976 | Adahan | 83/583 X |
| 4,114,491 | 9/1978 | Hashimoto | 83/583 X |

*Primary Examiner*—J. M. Meister

*Attorney, Agent, or Firm*—Watson, Cole, Grindle & Watson

[57] ABSTRACT

A device for cutting a paper web includes a rotary blade assembly, a stationary or non-rotatable blade in cutting engagement with the rotary blade assembly and being retractable from the rotary blade assembly during the cutting engagement therewith, guide members supporting the non-rotatable blade for sliding movement in the direction of the retraction, and the non-rotatable blade being biased into cutting engagement with the rotary blade assembly.

8 Claims, 8 Drawing Figures

FULL ROTATION-TYPE PAPER WEB CUTTING DEVICE

BACKGROUND OF THE INVENTION

This invention relates to a cutting device which comprises a rotary blade and a non-rotatable blade which is slightly retractable from the rotary blade out of contact therewith, and which device is adapted to cut a paper web such as the paper used in the form of a roll for copying machines.

Conventional cutting devices of this type are basically constructed as shown in FIGS. 1 to 3, and comprise a rotary blade 2 and a stationary blade 1 overlapping the blade 2 with a lap progressively increasing from one end A of the lapping portion to the other end B. The rotary blade 2 is inclined at a shear angle $\alpha$ with respect to its shaft portions 2*a*. With the rotation of the rotary blade 2, both blades come into point contact with each other progressively from the one end A toward the other end B to cut a paper web (not shown) moving in the direction of the arrow of FIG. 1. The stationary blade 1 is pivotably supported on a rod 1*a*. A pin 1*b* extends from the free end of the stationary blade 1, and a spring 3 is mounted in place at one end and is connected at its other end to pin 1*b* for holding opposite ends of the stationary blade 1 in bearing contact with flanges 2*b* at opposite ends of the rotary blade 2. When both the blades come into contact with each other progressively from point-to-point with the rotation of the rotary blade 2, the stationary blade 1 is pivotally movable slightly away from the rotary blade 2.

With the device described above, the lap at the end B, if excessively large, will result in rapid wear on the blades, require an increased drive force for the rotary blade and cause much noise or other objections, whereas if it is too small, the paper will not be cut properly. Thus the lap is extremely difficult to adjust. According to the conventional structure, moreover, the side of the stationary blade 1 which is difficult to machine to a planar finish is adapted for bearing contact with the flanges 2*b* of the rotary blade 2 to position the blade 1 in place. The stationary blade cannot therefore be favorably machine. There is another drawback in the structure in which the stationary blade 1 is supported pivotably by the rod 1*a* and held in contact with the rotary blade 2 by the spring 3. Since the stationary blade 1 is of the pivotal type, it is not smoothly retractable when the rotary blade 2 rotates for cutting. This is disadvantageous in view of the attendant wear of the blades, the increased torque needed and the resulting noise.

SUMMARY OF THE INVENTION

The object of this invention is to provide a cutting device comprising a rotary blade and a stationary or non-rotatable blade adapted, at a side face thereof which is easier to machine to a planar finish, for bearing contact with the rotary blade so that the device is usable with reduced wear on the blades or a lower noise almost without the necessity of adjusting the lap of the blades.

In order to achieve this object, the present invention provides a cutting device comprising a rotary blade and a non-rotatable or stationary blade slightly retractable from the rotary blade by contact therewith, the cutting device being characterized by guide means supporting the stationary blade slidably in the direction of the retraction and means for elastically biasing the stationary blade into contact with the rotary blade.

DESCRIPTION OF THE PREFERRED EMBODIMENTS

Figure 1:
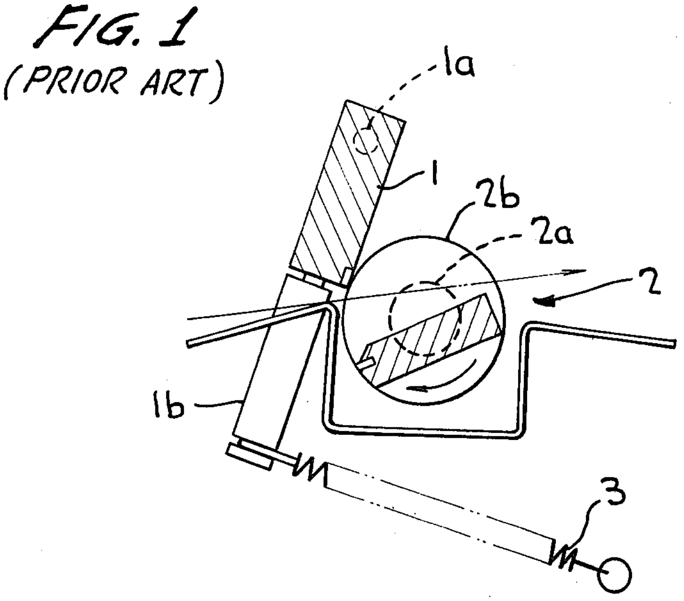
FIG. 1 (PRIOR ART)
FIGS. 1 to 3 are views showing a conventional cutting device.
Figure 2:
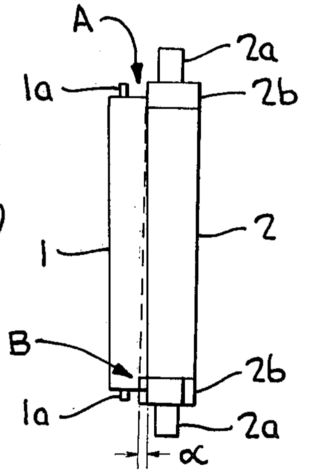
FIG. 2 (PRIOR ART)
Figure 3:
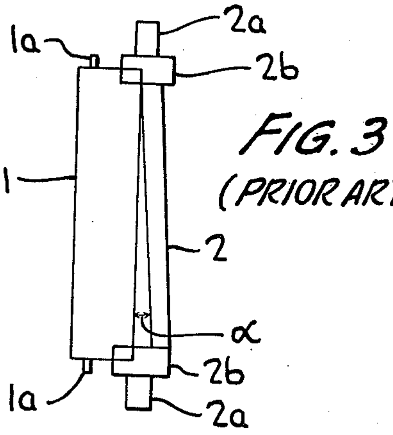
FIG. 3 (PRIOR ART)
Figure 4:
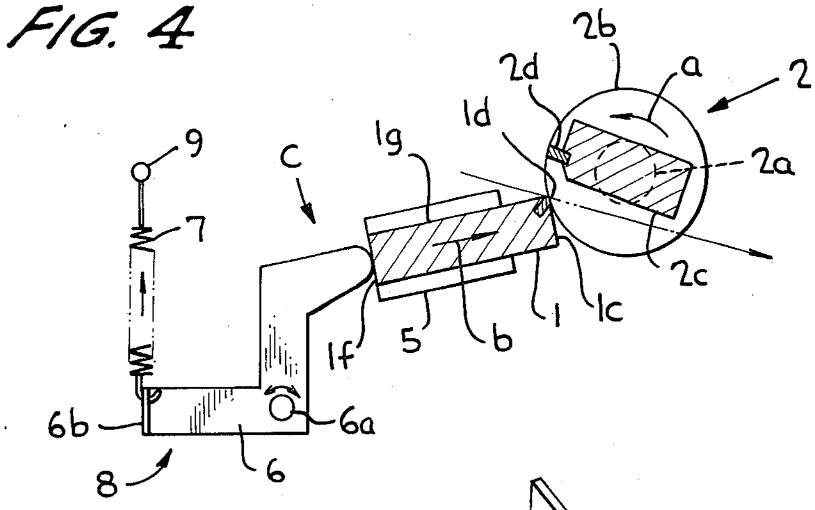
FIG. 4 is a view in section schematically showing a cutting device of the present invention.
Figure 5:
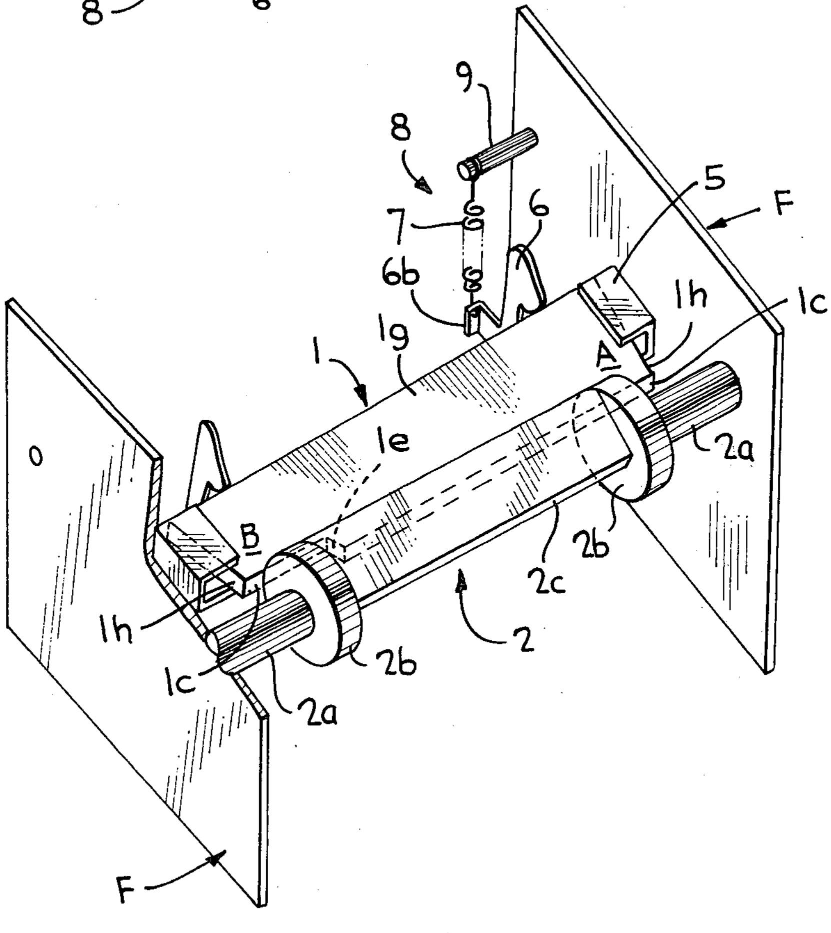
FIG. 5 is a perspective view of the device according to the invention

With reference to FIGS. 4 and 5 schematically showing a cutting device C of this invention, a rotary blade 2 has shaft portions 2*a* supported by the plate members of frame F of the device and is rotatable by a suitable drive mechanism (not shown) in the direction of an arrow a. Flanges 2*b* are integral with and coaxially rotatable with the shaft portions 2*a*. A support member 2*c* disposed between the flanges 2*b* is fixed thereto or integral therewith and is fixedly provided with a blade member 2*d* extending outwardly from its one side.

A stationary or non-rotatable blade 1 is slidably retained by guide members 5 secured to the frame F. The stationary blade 1 is so retained with its side face 1*c* in contact with the flanges 2*b* of the rotary blade 2, and has a blade member 1*d* opposed to the blade member 2*d* of the rotary blade 2. The guide members 5 are positioned in such a direction that the stationary blade 1 is slidable approximately in the direction of the normal of the flange 2*b* at a point of contact between the flange 2*b* and the side face 1*c* of the stationary blade 1. Opposite end faces 1*h* of the stationary blade 1 are maintained out of contact with the guide members 5. The stationary blade 1 is formed with a stepped portion 1*e* in its side face 1*c* so that when the side face 1*c* is in contact with the flanges 2*b*, the cutting edge of the stationary blade 1 inclines and overlaps the cutting edge of the rotary blade 2 with a lap progressively increasing from one end A to the other end B. The depth of the stepped portion 1*e* determines the lap of the two blades. Once designed to a specified depth, the stepped portion 1*e* enables the stationary blade 1 to be accurately positioned relative to the rotary blade 2 merely by being pressed against the blade 2. The side face 1*c* thus bearing against flanges 1*b* is more advantageous than the top surface 1*g* of the blade 1 bearing thereagainst as in the prior art, because it is easier to machine.

The slidably supported stationary blade 1 is pressed against the rotary blade 2 as mentioned above by being pushed on its rear side face 1*f* with biasing means 8 comprising a lever 6 and a spring 7 or the like. The lever 6 is pivotally mounted on a pivot 6*a* fixed to the frame F. The spring 7 has one end thereof attached to a lug 6 *b* of the lever 6 and the other end mounted on a pin 9 on the frame F to bias the lever 6 clockwise in FIG. 4 at all times, thereby urging the stationary blade 1 in the direction of an arrow b.

When the rotary blade 2 of the aforedescribed arrangement is rotated in the direction of the arrow a by suitable drive means, both the cutting edges of the blades are brought into point contact with each other progressively from the end A to the end B while the stationary blade 1 is being pushed along the guide members 5 against the action of the spring 7, to thereby cut a paper web (not shown) moving in the direction of the arrow (in phantom outline) of FIG. 4. In this way, the stationary blade 1 is retracted in the direction in which the rotation of the blade 2 exerts a force on the blade 1, namely, approximately in the direction of the normal of the circular path along which the rotating cutting edge moves at a point of contact between the blades 1 and 2. The retraction of the blade 1 takes place very smoothly without causing undesirable wear to the blade members **1*d* and 2*d* while permitting the rotation of the rotary blade 2** with reduced torque and mitigated noise.

Figure 6:
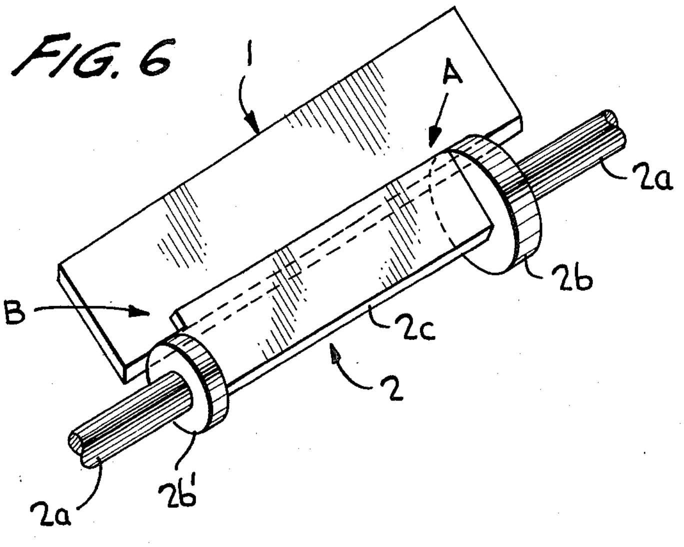
FIG. 6 is a fragmentary view showing another embodiment of the invention.

FIG. 6 shows another embodiment for lapping the cutting edges shown in FIG. 5 by the desired amount. In place of the aforementioned stepped portion formed in the side face **1*c*, the rotary blade 2 is provided with a flange 2*b*' having a smaller diameter than flange 2*b* and having its peripheral surface spaced from side face 1*c* thereof. While the cutting edge of the rotary blade 2 is adapted to advance into the stationary blade 1, this embodiment is comparable to the embodiment of FIG. 5** in cutting effect.

The biasing means 8 described with reference to the first embodiment can be suitably modified. For example, it may comprise only a spring means. And, the lever 6 may be designed in a suitably altered shape.

According to the embodiments described above, the two cutting edges come into point contact with each other progressively from one end A to the other end B with the rotation of the rotary blade 2 while permitting the stationary blade 1 to retract along the guide members 5.

The spring 7 of the biasing means 8, when adjusted to have a suitable biasing force, assures the progressive point-to-point contact between the two cutting edges.

The spring 7, if adjusted to a smaller biasing force, renders the rotary blade 2 rotatable with reduced torque and is therefore advantageous. However, it is then likely that upon the opposed cutting edges coming into contact with each other by virtue of the rotation of the blade 2, the resulting high impact will momentarily retract the stationary blade 1 to a position away from the rotary blade 2 in a bounding fashion, thereby temporarily interrupting the continuous point contact between the two edges to produce an imperfection in the cut paper web. This may, however, be avoided by the means shown in FIGS. 7 and 8.

When the spring 7 has a small biasing force, it is useful to provide a stopper on the frame of the device for restraining the retraction of the stationary blade 1.

Figure 7:
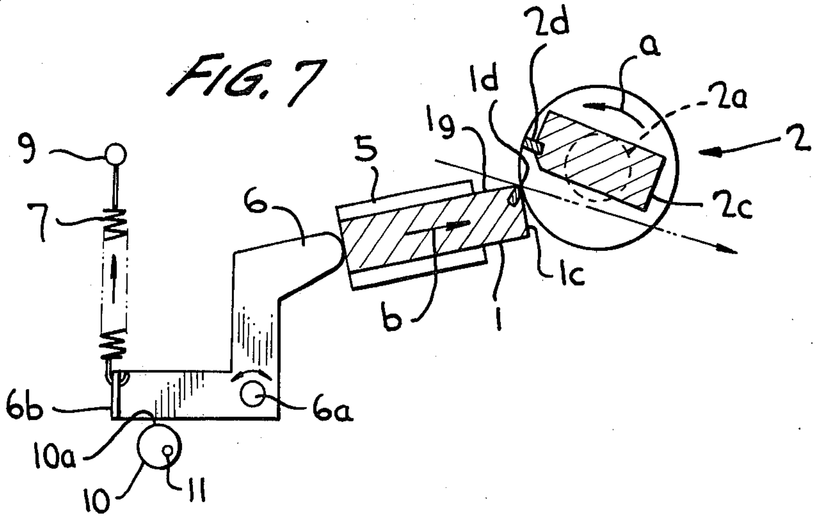
FIG. 7 is a view showing means used in the device of FIG. 4 for restraining the movement of a stationary blade.

FIG. 7 shows an adjusting cam 10 serving as such a stopper and having a cam face **10*a* for contact with a side edge 6*c* of the lever 6. The adjusting cam 10 is rotatably mounted on the frame F by an eccentric pin 11. The cam is adjustable by rotation to maintain, between the cam face 10*a* and the side edge 6*c* of the lever 6, a small gap which permits the desired retraction of the stationary blade 1 but does not permit an interruption of the point contact between the two cutting edges, namely, a gap slightly smaller than the sum of the thickness of the paper web and the depth of the stepped portion formed in the side face of the blade 1. The cam 10** is locked to its adjusted position and serves as a stopper.

Figure 8:
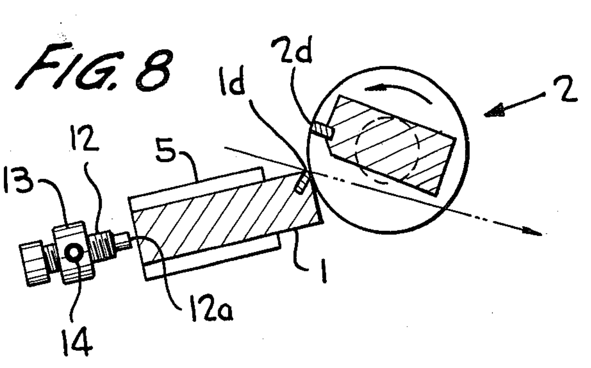
FIG. 8 is a perspective view showing another restraining means.

FIG. 8 shows another stopper in the form of an adjusting screw 12 for directly restraining the stationary blade 1. The screw 12 has an end face **12*a* adapted for contact with the rear side face 1*f* of the stationary blade 1. The adjustable screw 12 is turnably mounted on a support 13 fixed to the frame F and is adjustable to provide the same gap as stated with reference to FIG. 7. The biasing means 8 is not shown in FIG. 8 for the purpose of clarity. The screw 12 is locked to the adjusted position by a locking screw 14. Such screw-type stoppers are used in the same number as levers 6** as disposed close to the levers.

As will be apparent from the above description, the device of this invention comprises guide members for supporting a stationary blade slidably in a direction in which the blade is moved away from a rotary blade by contact therewith, and means for elastically biasing the stationary blade toward the rotary blade. This arrangement renders the stationary blade retractable very smoothly during the rotation of the rotary blade, thus assuring reductions in the wear of the blades, drive torque and noise. The device is therefore extremely useful.

Additionally, the stationary blade 1, with its side face **1*c* adapted for contact with the flanges 1*b* of the rotary blade 2, is easy to machine and further ensures accuracy and ease in setting the blades for the desired lap. Combined with the above slidable arrangement, this feature leads to another advantage that the position of the stationary blade 1** is adjustable with extreme ease.

We claim:

1. A device for cutting a paper web comprising:

a rotary blade assembly comprising a frame;

a non-rotatable blade in cutting engagement with said rotary blade assembly and being retractable from said rotary blade assembly during the cutting engagement therewith;

guide members supporting said non-rotatable blade for sliding movement in the direction of the retraction; and means for elastically biasing said non-rotatable blade into cutting engagement with said rotary blade assembly, said biasing means including a lever pivotally mounted on the frame, and a spring having one end connected to one end of the lever with the other end of the spring being mounted on the frame to bias the lever for urging the non-rotatable blade toward the rotary blade assembly.

2. The device according to claim 1, wherein the rotary blade assembly further comprises shaft portions rotatably mounted on the frame, spaced flanges mounted on and coaxially rotatable with the shaft portions, and a support member disposed between the flanges and fixed thereto, a blade member on one side of the support member, the non-rotatable blade being so retained with a side face thereof in contact with the flanges of the rotary blade and having a blade member opposed to the blade member of the rotary blade assembly.

3. The device according to claim 2, wherein the non-rotational blade is formed with a stepped portion in the side face thereof which contacts with one of the flanges provided at opposite ends of the rotary blade, the blades being in overlapping relation and the depth of the stepped portion determining the overlap of the two blades.

4. The device according to claim 2, wherein the flanges are provided at opposite ends of the rotary blade, one of the flanges having a smaller diameter and having a peripheral surface spaced from the blade member of the rotary blade.

5. The device according to claim 2, wherein the guide members are positioned in such a direction that the non-rotatable blade is slidable approximately in the direction of the normal of the flanges at a point of contact between the flanges of the rotary blade assembly and the side face of the non-rotatable blade.

6. The device according to claim 1, wherein the biasing means further includes a stopper on the frame for restraining retraction of the non-rotatable blade, when the spring has a small biasing force.

7. The device according to claim 6, wherein said stopper comprises an adjusting cam having a cam face for contact with a side edge of the lever.

8. The device according to claim 6, wherein the stopper comprises an adjusting screw having an end face adapted for contact with a rear side face of the stationary blade.

* * * * *

UNITED STATES PATENT OFFICE
CERTIFICATE OF CORRECTION

PATENT NO. : 4,244,251
DATED : January 13, 1981
INVENTOR(S) : SOUICHI IWAO et al It is certified that error appears in the above-identified patent and that said Letters Patent are hereby corrected as shown below:

In the Foreign Application Priority Data, correct the filing date of the Japanese Application to -- April 24, 1978 --.

Signed and Sealed this

***Ninth* Day of *June 1981***

[SEAL]

*Attest:*

RENE D. TEGTMEYER

*Attesting Officer* *Acting Commissioner of Patents and Trademarks*